(12) United States Patent
Murray

(10) Patent No.: US 8,490,662 B2
(45) Date of Patent: Jul. 23, 2013

(54) MACHINE AND METHOD FOR MANUFACTURING A PACKAGED PRODUCT

(75) Inventor: R. Charles Murray, Sarasota, FL (US)

(73) Assignee: Pouch Pac Innovations, LLC, Sarasota, FL (US)

( * ) Notice: Subject to any disclaimer, the term of this patent is extended or adjusted under 35 U.S.C. 154(b) by 763 days.

(21) Appl. No.: 12/684,467

(22) Filed: Jan. 8, 2010

(65) Prior Publication Data

US 2010/0170591 A1 Jul. 8, 2010

Related U.S. Application Data

(60) Provisional application No. 61/143,196, filed on Jan. 8, 2009.

(51) Int. Cl.
 *B65B 1/04* (2006.01)
 *B67C 3/24* (2006.01)

(52) U.S. Cl.
 CPC ........................... *B67C 3/242* (2013.01)
 USPC ........... 141/372; 141/165; 141/166; 141/369; 198/678.1

(58) Field of Classification Search
 USPC .. 141/165, 166, 369, 372; 53/251; 198/678.1, 198/681; 406/86, 88
 See application file for complete search history.

(56) References Cited

U.S. PATENT DOCUMENTS

| | | | | |
|---|---|---|---|---|
| 5,050,722 A | * | 9/1991 | Beswick | 198/392 |
| 5,123,993 A | * | 6/1992 | Wiggins | 156/750 |
| 5,388,705 A | * | 2/1995 | Fine et al. | 209/524 |
| 5,396,981 A | * | 3/1995 | Ohtsuji et al. | 198/659 |
| 5,501,552 A | * | 3/1996 | Simkowski | 406/52 |
| 5,553,698 A | * | 9/1996 | Patois et al. | 198/626.1 |
| 5,555,700 A | * | 9/1996 | Marti | 53/48.1 |
| 5,558,200 A | * | 9/1996 | Whitby et al. | 198/470.1 |
| 6,253,809 B1 | * | 7/2001 | Paradies | 141/372 |
| 6,338,371 B1 | * | 1/2002 | Araki et al. | 141/145 |
| 7,261,199 B2 | * | 8/2007 | Hartness et al. | 198/470.1 |
| 7,331,156 B2 | * | 2/2008 | Hartness et al. | 53/251 |

FOREIGN PATENT DOCUMENTS

JP 11129723 A 5/1999

* cited by examiner

*Primary Examiner* — Timothy L Maust
(74) *Attorney, Agent, or Firm* — Gifford, Krass, Sprinkle, Anderson & Citkowski, P.C.; Thomas E. Anderson

(57) ABSTRACT

A machine and method for filling a container is provided. The container has a fitment. The fitment includes a spout having a collar. The collar includes a support surface for supporting the container in suspension. The machine includes a filling apparatus configured to fill the container with a product, a rail system, a loader, and a carrier. The carrier is configured to hold multiple containers. The carrier is generally elongated and has a pair of spaced apart flanges. The spaced apart flanges define a slot extending the length of the carrier. The slot is configured to slidingly receive the spout of the container and the support surface of the collar engages each of the pair of flanges so as to suspend the container within the carrier. The carrier may be placed into communication with the rail system so as to feed the containers to the filling apparatus.

11 Claims, 6 Drawing Sheets

MACHINE AND METHOD FOR MANUFACTURING A PACKAGED PRODUCT

CROSS-REFERENCE TO RELATED APPLICATION

This application claims priority of U.S. Provisional Patent Application Ser. No. 61/143,196 filed Jan. 8, 2009, which is incorporated herein by reference.

BACKGROUND OF THE INVENTION

1. Field of the Invention

The present invention relates generally to a machine for producing packaged products at a high volume. Specifically, the machine includes a filling apparatus having a loading device. The loading device is operable to hold a plurality of containers and feed those containers to the filling apparatus so as to mass produce filled containers at a high volume.

2. Description of the Related Art

Automated machines for high-volume mass production of filled containers are known. These machines typically transfer a container along an assembly line from one workstation to another so as to fill the container. The workstations are arranged sequentially to perform filling operations in a logical sequence. Through the use of automated machinery, the sequential operations can occur at a relatively high rate.

The rate of operation may be affected by the way in which the container is transferred between workstations. One transfer technique utilizes a human operator to feed the containers into the assembly line. Another transfer technique utilizes a transfer device, such as a robot, an electromechanical device, or the like to perform the feeding operations. A coordinated input/output of the containers with respect to the machine is necessary to maximize production rate.

An element of such coordination includes the accurate and consistent positioning of the containers as they are fed onto the machine. More specifically, minimizing the variation in position when introducing the containers to the machine reduces error and facilitates efficiency in the manufacturing process. Furthermore, the overall speed and accuracy of the automated machine may be compromised due to the improper coordination between the loading device and other associated workstations along the assembly line. Thus, there is a need for a machine with a loading device that consistently, accurately and quickly feeds the containers to the machine and wherein feeding operations are in coordination with the assembly line.

SUMMARY OF THE INVENTION

One advantage of the present invention is that an improved machine, method and machine for unloading or loading a container to or from an assembly line is provided. Another advantage of the present invention is a machine and method for consistently feeding the containers to the assembly line. A further advantage of the present invention is a machine and method for unloading or loading an object that is cost effective to implement. Yet a further advantage of the present invention is a machine and method that improves the processing speed of the assembly line. Still yet a further advantage of the present invention is a carrier and loader operable to feed a plurality of containers into the machine.

Other features and advantages of the present invention will be readily appreciated, as the same becomes better understood after reading the subsequent description taken in conjunction with the accompanying drawings.

DETAILED DESCRIPTION OF THE INVENTION

Figure 1:
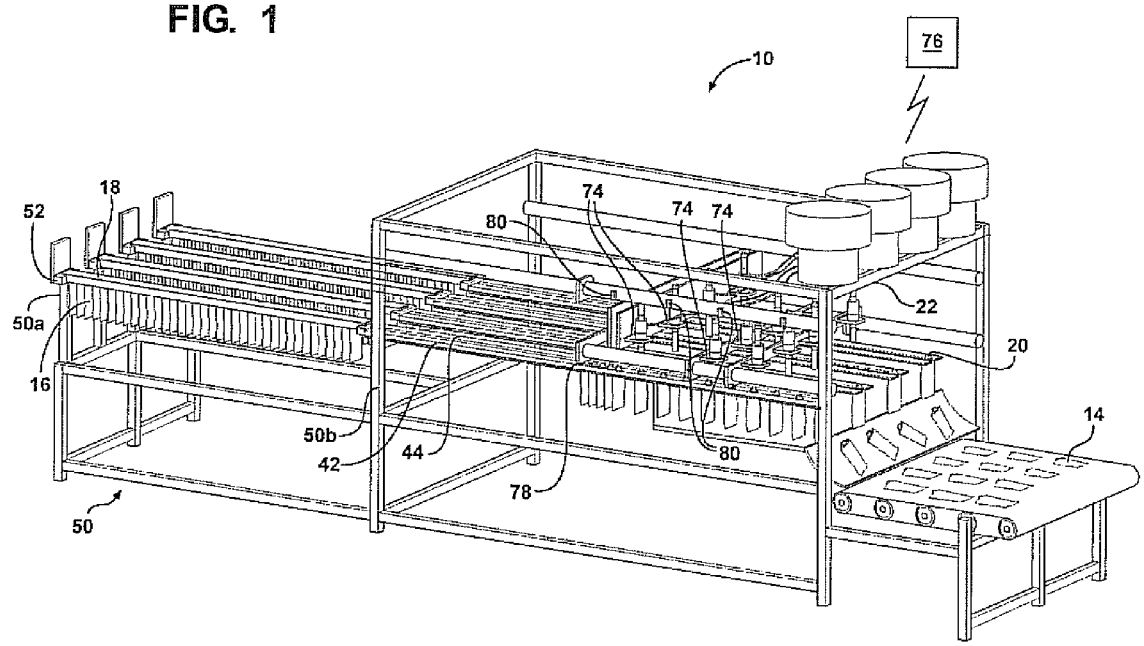
FIG. 1 is an elevational view of a flexible pouch with a spout fitment for use with a carrier and rail system.

A machine 10 and method 12 for mass producing a packaged product 14 in high volume is provided. More particularly, a machine 10 and method 12 is provided for mass producing a packaged product 14 using a carrier 18. It should be appreciated that the type, form, size and usage of the container 16 is unlimited. For example, the container 16 may be a flexible pouch, tray, or the like containing a food or drink item. The product may also be a non-food item, and may have a form that is solid, liquid, granular or a combination thereof.

The Container

Figure 4:
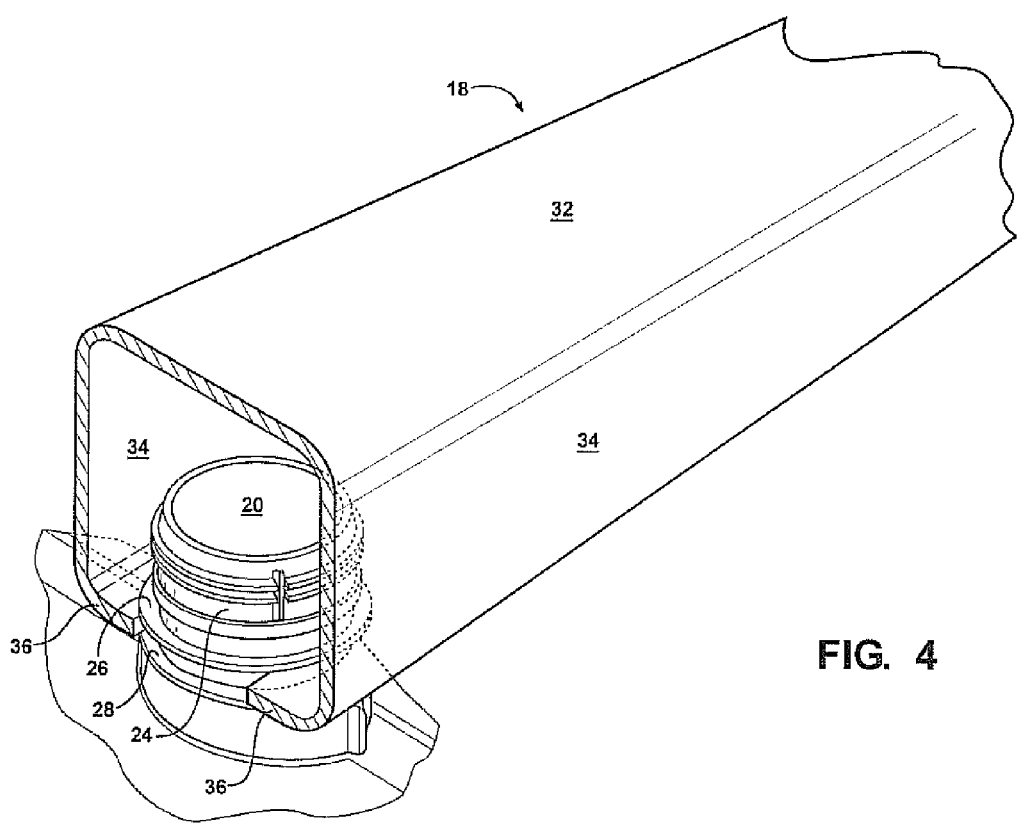
FIG. 4 is a view taken from the end of the machine of FIG. 2, showing a pouch suspended by the carrier.

For illustrative purposes, the container 16 is a flexible pouch 16 having a fitment 20, as shown in FIGS. 1 and 4, and the product is a beverage. The flexible pouch 16 may assume various shapes, such as cylindrical, cubical, conical, spherical, or the like. The flexible pouch 16 may be manufactured from sheets of laminate material. Any pouch 16 manufacturing machine currently known and used in the art is suitable for use herein, illustratively including a machine manufactured by Nishibe, such as the model number SBM500, SMB600 or SMB700. Another example is the PSG LEE.

The pouches 16 are fed into a filling apparatus 22 so as to fill each pouch 16 with a product. The machine 10 may further include other apparatuses operable to perform tasks to ready the filled pouch 16 for commercial use. For instance, one apparatus may include a nozzle for washing the exterior of the pouch 16. Another apparatus may include a mounting device for mounting a cap (not shown) onto the fitment 20. Yet another apparatus may include a sealer for providing a tamper-evident seal around the cap.

The pouch 16 is manufactured to include an opening for accessing or dispensing the contents therein. The opening may he formed anywhere on the pouch 16, such as along the side of the pouch 16, or in a portion of a wall of the pouch 16. The opening is fitted with a fitment 20. The fitment 20 includes a spout 24 and a collar 26 extending radially from the outer surface of the spout 24. The collar 26 may further include a removable and replaceable cap (not shown) secured to the spout 24. The spout 24 is mounted to the opening. The collar 26 includes a support surface 28 for carrying and transferring the pouch 16 during processing.

The Carrier

Figure 3:
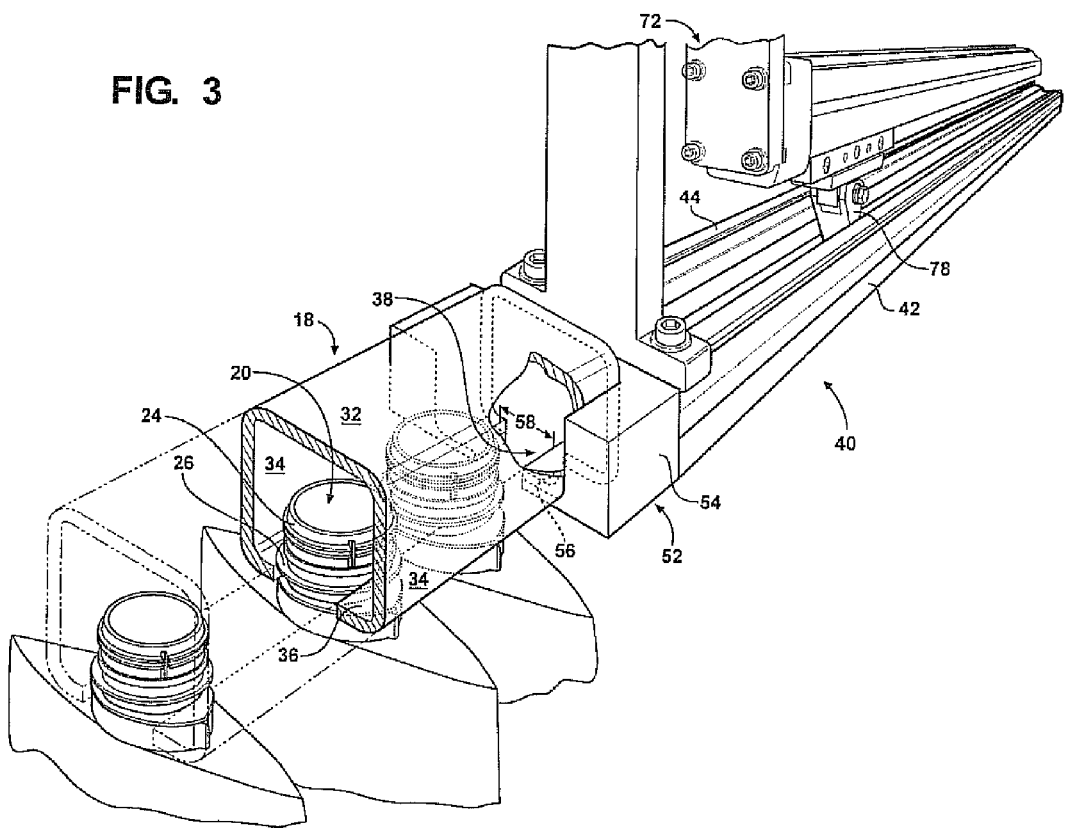
FIG. 3 is a perspective view of the machine of FIG. 2 showing a carrier axially aligned to the rail system.

The machine 10 further includes a carrier 18. The carrier 18 is operable to hold a plurality of fitments 20. With reference now to FIGS. 3 and 4, an illustration of a carrier 18 is provided. The carrier 18 engages the fitments 20 by their collar 26 so as to hold the pouches 16 in suspension. The carrier 18 has an elongated first wall 32, and a pair of side walls 34 extending from opposing sides of the first wall 32 so as to form a generally "U" shape. The carrier 18 further includes a pair of flanges 36. One of the pair of flanges 36 is disposed on one of the pair of side walls 34, and the other of the pair of flanges 36 disposed on the other of the pair of side walls 34. Each of the pair of flanges 36 extend towards each other and is spaced a predetermined distance apart from the other so as to form a slot 38 extending the length of the carrier 18.

The carrier 18 may be stamped out of a durable material such as steel. The U-shaped carrier 18 is loaded with pouches 16 and carries the individual pouches 16 by the collar 26 of the fitment 20. It should be appreciated that the pouches 16 may be placed within the U-shaped carrier 18 by a robotic handler or by a worker. It should also be also appreciated that the length of the U-shaped carrier 18 will determine the number of containers 16 that the carrier 18 can hold. For instance a carrier 18 that is three feet long may be able to hold two hundred pouches 16 whereas a carrier 18 that is only 1.5 feet long can only hold one hundred pouches 16.

The flanges 36 of the carrier 18 are configured to engage the collar 26 of the fitment 20 so as to hold a predetermined number of fitments 20 in suspension. Specifically, the spout 24 may be slid within the slot 38 such that the support surface 28 of the collar 26 of each fitment 20 rests upon a portion of each of the flanges 36 of the carrier 18. Thus the pouches 16 are suspended within the U-shaped carrier 18 by their respective collar 26. In this manner the carrier 18 may be loaded with a predetermined number of pouches 16 and fed into the filling apparatus 22.

The Rail System

The filling apparatus 22 includes a rail system 40. The rail system 40 includes a first rail 42 spaced apart from the second rail 44. The first rail 42 is spaced apart the second rail 44 so as to accommodate the spout 24 of the fitments 20, engage the support surface 28 of the collars 26, and hold the pouches 16 in suspension. The carrier 18 is positioned against the upstream end of the rail system 40 so as to feed the pouches 16 onto the rail, as shown in FIGS. 1 and 3. More specifically, the flanges 36 of the carriers 18 are aligned axially to respective first and second rails 42, 44. Thus the fitments 20 slide from the carrier 18 onto the rail system 40 and are positioned for filling operations.

The Loader

The machine 10 may include a loader 46. The loader 46 is adapted to hold a predetermined number of carriers 18. In one embodiment, the loader 46 is adapted to deliver the pouches 16 contained in the carrier 18 in a linear manner. With reference now to FIGS. 1-4, the loader 46 includes a frame 48 configured to receive a predetermined number of carriers 18. The frame 48 includes a pair of supports 50. The pair of supports 50 includes a first support 50a opposite and spaced apart a second support 50b. The first support 50a is spaced a predetermined distance apart from the second support 50b so as to fit a carrier 18 there between. The first and second supports 50a, 50b may be adapted to hold respective ends of the carrier 18.

Alternatively, the loader 46 may include a pair of mounting members 52. Each of the pair of mounting members 52 is disposed on respective first and second supports 50a, 50b. The mounting members 52 are configured to hold the carrier 18 so as to feed the fitments 20 to the rail system 40. The mounting member 52 may be a block 54 stamped out of metal. With reference now to FIG. 3, the block 54 includes a portion 56 adapted to receive an end of the carrier 18, Specifically, a portion 56 of the block 54 is cut out so as to form a seat configured to hold the end of the carrier 18. A portion of the mounting member 52 includes an aperture 58. The aperture 58 is axially aligned with the slot 38 of the carrier 18 when the carrier 18 is seated within the cut-out of the mounting member 52. Each end of the carrier 18 is mounted to respective mounting members 52 and positioned such that the flanges 36 of the carrier 18 are axially aligned with the first and second rails 42, 44. The loader 46 is operable to position one of the carriers 18 to engage the rail so as to deliver the pouches 16 to the filling apparatus 22. Thus, the containers 16 are free to move from the carrier 18 onto the rail system 40.

Figure 2:
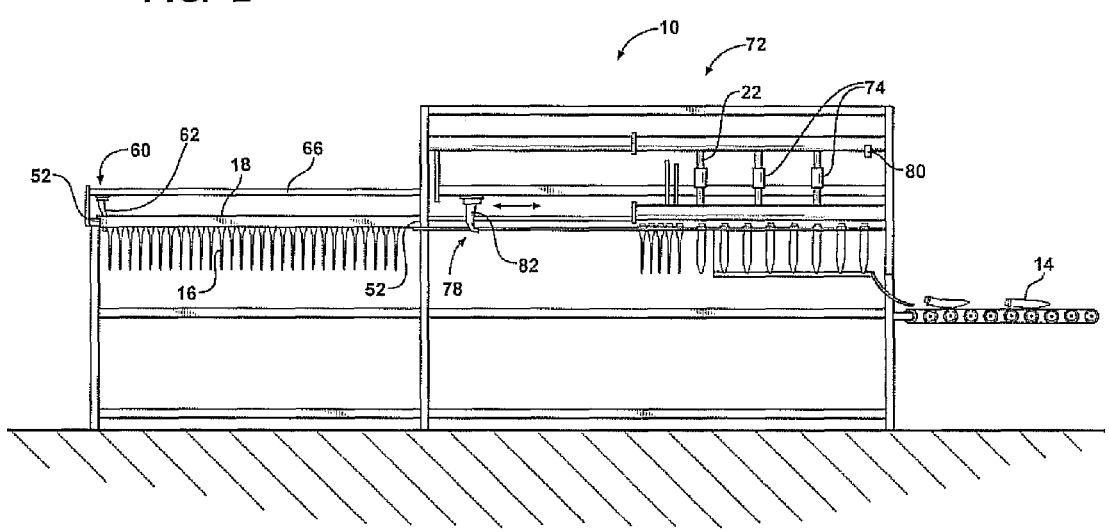
FIG. 2 is a side view of a machine for manufacturing a pouch.

With reference now to FIG. 2, the loader 46 may further include a feeder 60. The feeder 60 has a finger 62 operable to push the pouches 16 from the carrier 18 onto the rail system 40. Preferably, the finger 62 is driven by a drive 64. The drive 64 is operatively attached to a support member 66. The support member 66 is a generally elongated member extending from the first support 50a to the second support 50b. The support member 66 is fixedly mounted to the frame 48 and may be disposed above the mounting members 52.

Figure 5:
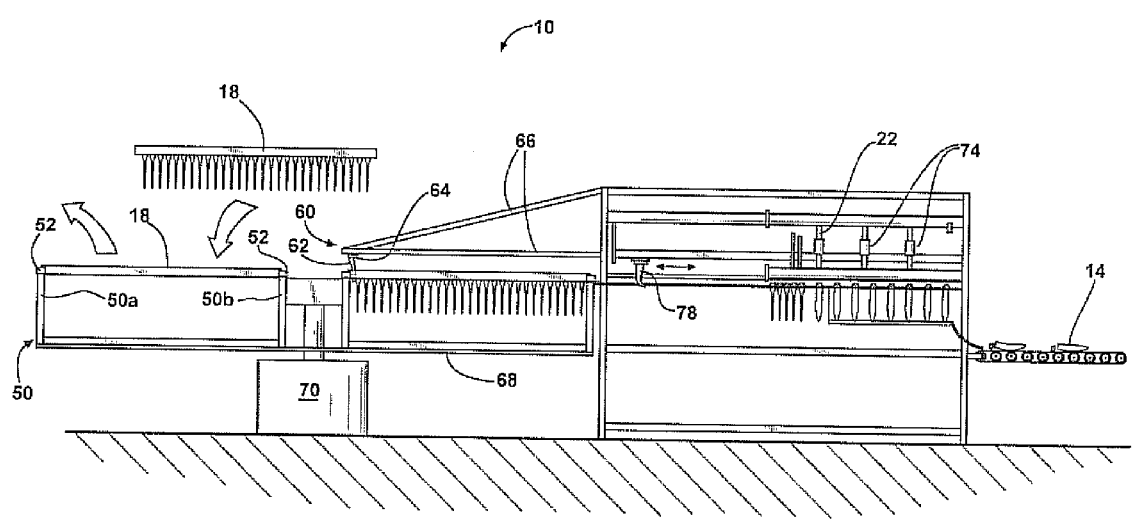
FIG. 5 is second preferred embodiment of the loader.

The finger 62 is driven along the support member 66 by the drive 64 and engages the pouches 16 so as to feed the pouches 16 onto the rail system 40. Once the carrier 18 has been emptied, the emptied carrier 18 may be replaced with a filled carrier 18. Thus the position of the carrier 18 with respect to the rail system 40 is constant throughout feeding operations. As such, feeding the pouches 16 to the machine 10 is done quickly and efficiently as coordination of feeding operations is made relatively simply—load the carrier 18 and seat the loaded carrier 18 onto respective mounting members 52, as indicated by the arrows in FIG. 5.

With reference again to FIG. 5, a second preferred embodiment of the loader 46 is provided. In the second preferred embodiment, the loader 46 includes a turntable 68. The frame 48 is mounted onto the turntable 68. The frame 48 includes a plurality of pairs of supports 50. Each of the pair of supports 50 has a first support 50a opposite and spaced apart a second support 50b so as to hold a carrier 18 between respective first and second supports 50a, 50b. The mounting members 52 are mounted onto each of the first and second supports 50a, 50b. Similar to above, the ends of each carrier 18 are seated onto respective mounting members 52 of the pairs of supports 50 and positioned such that the flanges 36 of each carrier 18 are axially aligned with the first and second rails 42, 44. Each of the pairs of supports 50 extends radially from the center of the turntable 68.

The turntable 68 may be rotated so as to register the carriers 18 to the first and second rails 42, 44. The turntable 68 may be rotated manually, or may include a turntable drive 70 operable to rotate the turntable 68. The turntable 68 includes a feeder 60, operable to push the pouches 16 off of the carrier 18 and onto the rail system 40. The feeder 60 includes a finger 62 operatively mounted to an elongated support member 66. The support member 66 may be attached to the machine 10. The elongated support member 66 is axially aligned with the first and second rails 42, 44. When one of the carriers 18 on the turntable 68 is registered to the first and second rails 42, 44, the finger 62 is operable to push the pouches 16 off of the carrier 18 and onto the rail system 40 for filling operations. The emptied carriers 18 mounted on the loader 46 may then be replaced with filled carriers 18.

The Machine

The machine 10 is configured to fill pouches 16 with fitments 20 at a high volume. The machine 10 includes a housing 72 having a rail system 40 and a plurality of workstations 74 selectively distributed along the rail system 40 so as to form an assembly line. One of the workstations 74 includes a filling apparatus 22 operable to fill the pouches 16. The machine 10 includes a controller 76 such as a programmable logic controller 76 (PLC). The controller 76 is communication with the machine 10. As shown in FIGS. 2-4, the fitment 20 is suspended by the rail system 40, and slid along the rail system 40 to various workstations 74. Specifically, the rail system 40 includes a first rail 42 spaced apart from a second rail 44. The fitment 20 is slid into the space between each rail 42, 44 such that the pouch 16 is held between the first and second rails 42, 44 and suspended by the support surface 28 of the collar 26.

The machine 10 further includes a mover 78 operable to move each of the pouches 16 along the rail system 40 so as to position the pouches 16 at the workstations 74 arranged along the assembly line. The mover 78 is also controlled by the controller 76, and may include sensors 80 directed towards detecting the location of the mover 78 along the rail system 40. The mover 78 may be disposed either overhead of the rail system 40, below the rail system 40, or integrated with the rail system 40. Any mover 78 currently known and used in the art is adaptable for use herein, illustratively including a pusher 82 driven by a servo drive 64. The servo drive 64 is attached to the rail system 40 and is operative to move along the rail system 40.

Each of the plurality of workstations 74 is equipped with a tool for performing a predetermined task. The workstations 74 are also controlled by the controller 76 and arranged along the rail system 40 so as to manufacture a filled flexible pouch 16 in a logical and sequential manner. Though the workstations 74 are shown overhead of the rail system 40, it is anticipated that some workstations 74 may be disposed beneath the rail system 40.

In operation, the flexible pouches 16 are loaded onto a carrier 18. Specifically, the flexible pouches 16 are slid into the slot 38 of the carrier 18 and the support surface 28 of the collar 26 is engaged with the flanges 36 of the carrier 18. Thus, the pouches 16 are suspended within the carrier 18 by the collar 26 when loaded. Each end of the loaded carrier 18 is then mounted onto respective mounting members 52 of the loader 46. With reference to the first preferred embodiment of the loader 46, the flanges 36 of the loaded carrier 18 are positioned to be aligned axially with respective rail systems 40 of the machine 10. The controller 76 actuates the finger 62 so as to push the pouches 16 from the loader 46 onto the rail system 40. Once engaged with the rail system 40, the controller 76 actuates the mover 78 so as to advance individual pouches 16 downstream the rail system 40 to individual workstations 74. As stated above, a sensor 80, such as a position sensor 80, may be used to ensure the flexible pouch 16 is positioned properly at the respective workstation 74. The empty carriers 18 may then be removed from the loader 46 and loaded with more pouches 16 for filling operations, and loaded carriers 18 may be mounted onto the empty pair of supports 50.

With respect to the second preferred embodiment of the loader 46, loaded carriers 18 are mounted onto each of the pair of supports 50. Specifically, each end of the loaded carrier 18 is mounted to respective mounting members 52. The controller 76 actuates the turntable 68 so as to axially align one of the loaded carriers 18 with the rail system 40. The controller 76 then actuates the finger 62 to push the pouches 16 onto the rail system 40. Once all of the pouches 16 have been fed into the rail system 40, the controller 76 actuates the turntable 68 so as to axially align the succeeding loaded carrier 18 with the rail system 40. The empty carrier 18 may be removed, loaded with more pouches 16, and mounted back onto the loader 46 to maintain pouch 16 production. The empty carrier 18 may be manually or automatically replaced with a loaded carrier 18.

Preferably, the first workstation 74 is a filling apparatus 22 operable to fill the pouches 16 with a desired product. The controller 76 actuates the drive 64 to move the finger 62 into engagement with the pouches 16. The finger 62 pushes the pouches 16 a predetermined distance so as to introduce the pouches 16 onto the rail system 40. The machine 10 then actuates the mover 78 to position the first pouch 16 to the filling apparatus 22 wherein the filling apparatus 22 applies a vacuum pressure through the fitment 20, and then fills the flexible pouch 16 with a product. The filling apparatus 22 may have a downwardly engaging spout configured to deliver product through the fitment 20 opening and into the flexible pouch 16. Once the flexible pouch 16 has been filled, the controller 76 actuates the mover 78 so as to push the flexible pouch 16 a predetermined distance to the next workstation 74 located downstream the rail system 40. The workstations 74 may be configured to perform various pouch filling operations such as mounting a cap onto the fitment 20, adding a tamper-evident seal, or rinsing the pouch 16 after filling operations.

The machine 10 may be adapted to process a plurality of pouches 16 at any given time. With reference again to FIG. 4, the machine 10 is shown including four assembly lines running in parallel to each other. Each assembly line includes a rail system 40. A linear arrangement of workstations 74 is disposed along each of the rail system 40. Each of the assembly lines is in communication with a loader 46 and is operable to receive pouches 16 from respective loaders 46. The assembly lines may be operated simultaneously or sequentially depending upon the desired output. Once the pouches 16 have been processed at each workstation 74 in the assembly line, the mover 78 pushes the commercially ready pouches 16 off of the rail system 40 and onto a ramp, where the pouches 16 may be collected and packaged for shipment.

The Method

Figure 6:
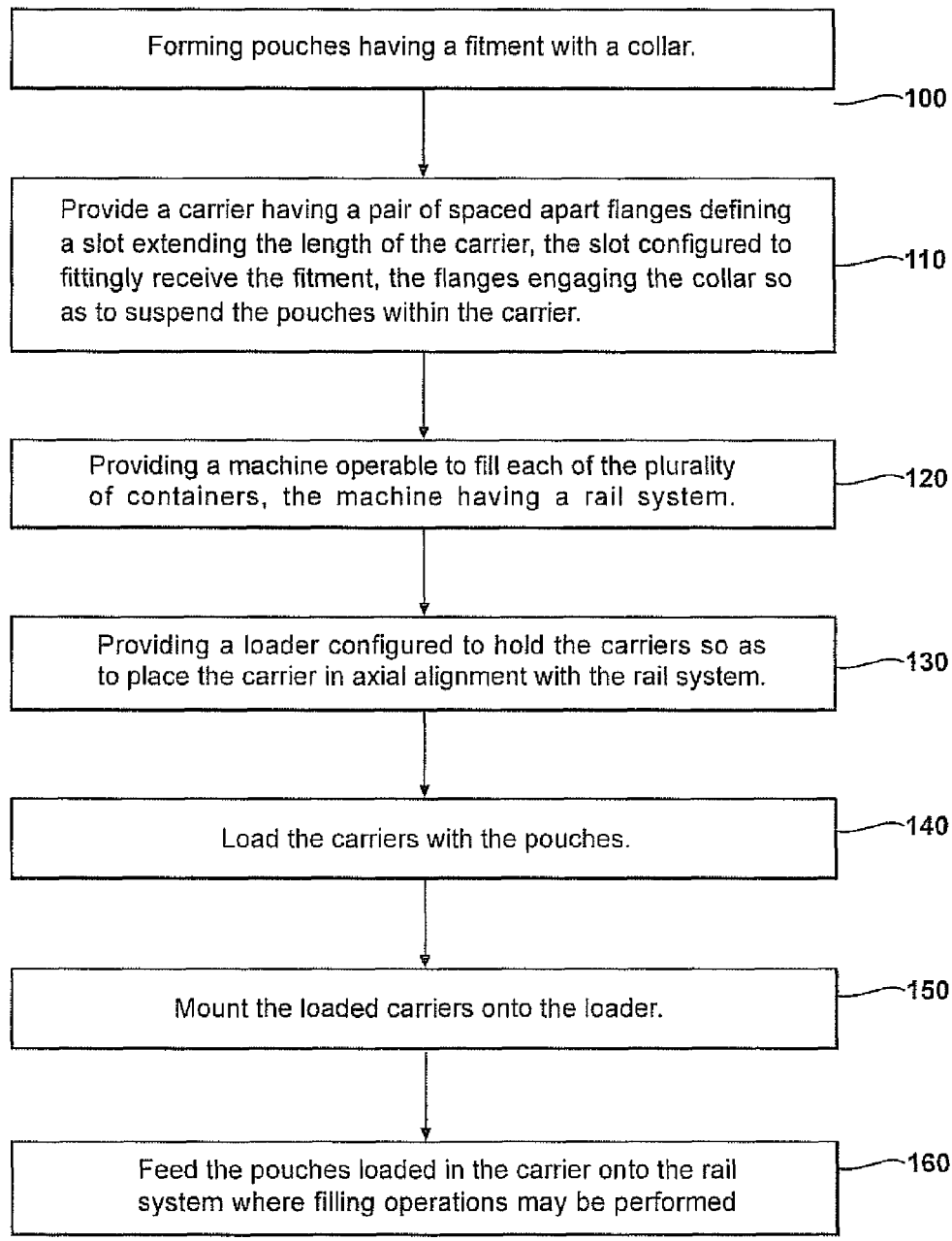
FIG. 6 is a diagram illustrating a method of forming a packaged product according to the present invention.

With reference now to FIG. 6, a method 12 for filling pouches 16 is provided. The method 12 begins in block 100 and includes the step of forming pouches 16 having a tube spout 24 fitment 20 with a collar 26. The method 12 proceeds to block 110 where carriers 18 are provided. The carrier 18 has a general U-shape. The carrier 18 may be stamped out of a durable material such as steel. Each carrier 18 includes a pair of inwardly extending flanges 36. The flanges 36 are spaced apart from each other so as to define a generally elongated slot 38 extending along the length of the carrier 18.

The method 12 proceeds to block 120 where a machine 10 operable to fill the pouches 16 is provided. The machine 10 includes a rail system 40 having a first rail 42 spaced apart a second rail 44. The machine 10 further includes a filling apparatus 22 operable to introduce a product into the pouches 16. The machine 10 may include other apparatuses directed towards processing the pouch 16 into a commercial ready packaged product 14. The apparatuses are aligned sequentially along the rail system 40.

The method 12 proceeds to block 130 where a loader 46 is provided. The loader 46 is adapted to deliver the pouches 16 loaded in the carrier 18 to a machine 10 for filling the pouch 16. In a first preferred embodiment, the loader 46 includes a frame 48 having a pair of supports 50. Each of the supports has a mounting member 52. The mounting members 52 are axially aligned to each other. The mounting members 52 are configured to hold the carrier 18 so as to feed the pouches 16 to the rail system 40. The mounting member 52 may be a block 54 stamped out of metal. The block 54 includes a cut-out adapted to receive an end of the carrier 18. Each end of the carrier 18 is mounted to respective mounting members 52 and positioned such that the flanges 36 of the carrier 18 are axially aligned with the first and second rails 42, 44.

In a second preferred embodiment, the loader 46 includes a turntable 68. The frame 48 is fixedly mounted onto the turntable 68. The frame 48 includes a plurality of pairs of supports 50. Each support 50 includes a mounting member 52. The mounting member 52 is configured to hold respective ends of the carrier 18 between each support 50. Similar to above, the ends of each carrier 18 are mounted to respective mounting members 52 of each support 50 and the carriers 18 are positioned such that the flanges 36 of each carrier 18 are axially aligned with the first and second rails 42, 44. The turntable 68 may be rotated so as to register the carriers 18 to the first and second rails 42, 44. Thus, when a pair of supports 50 is axially aligned with the first and second rails 42, 44, the pouches 16 may be slid from the carrier 18 and onto the rail system 40 for filling operations.

The method 12 proceeds to block 140 where the carriers 18 are loaded with the pouches 16. Specifically, the collars 26 of the pouches 16 are inserted into the slot 38 of the carrier 18, and are held in suspension by the flanges 36. The method 12 proceeds to block 150 where the carriers 18 are mounted to the loader 46. The method 12 proceeds to block 160 where the pouches 16 are fed from the carrier 18 onto the rail system 40 where the filling apparatus 22 fills the pouches 16 with a desired product.

The turntable 68 may further include a feeder 60, operable to push the pouches 16 off of the carrier 18 and onto the rail system 40. The feeder 60 includes a finger 62, a drive 64, and an elongated support member 66. The drive 64 is operatively mounted to the support member 66 so as to move along the support member 66. The finger 62 is operatively attached to the drive 64. The elongated support member 66 is axially aligned with the first and second rails 42, 44. When one of the carriers 18 on the turntable 68 is registered to the first and second rails 42, 44, the drive 64 is actuated so as to move the finger 62 to engage the pouches 16 and push the pouches 16 off of the carrier 18 and onto the rail system 40 for filling operations. The emptied carriers 18 mounted on the loader 46 may then be replaced with filled carriers 18.

The present invention has been described in an illustrative manner. It is to be understood that the terminology which has been used is intended to be in the nature of words of description rather than of limitation. Many modifications and variations of the present invention are possible in light of the above teachings. Therefore, the present invention may be practiced other than as specifically described.

I claim:

1. A machine for filling a container, the container having a fitment, the fitment including a spout having a collar, the collar including a support surface for supporting the container in suspension, the machine comprising:
   a filling apparatus configured to fill the container with a product;
   a rail system having a first rail spaced apart a second rail;
   a loader having a frame, the frame having a pair of supports, the pair of supports having a first support spaced apart and opposite a second support;
   a carrier configured to hold the container, the carrier being generally elongated and having a pair of flanges, one of the pair of flanges is spaced apart from the other so as to define a slot extending the length of the carrier, the slot configured to slidingly receive the spout of the container, the support surface of the collar engaging each of the pair of flanges so as to suspend the container within the carrier; and
   a pair of mounting members configured to hold respective ends of the carrier, one of the pair of mounting members is disposed on the first support and the other of the pair of mounting members is disposed on the second support, and the pair of mounting members are disposed on the frame so as to hold the carrier in axial alignment with the rail system.

2. The machine as set forth in claim 1, further including a feeder, the feeder having a drive operatively mounted onto a support member, and a finger operatively attached to the drive, the drive operable to actuate the finger so as to push the plurality of containers from the carrier onto the pair of spaced apart rails.

3. The machine as set forth in claim 1, wherein the mounting member is a block, the block having a portion configured to fittingly receive an end of the carrier, and wherein a portion of the block includes an aperture, the aperture configured to allow a portion of each of the plurality of containers to pass through the mounting member.

4. The machine as set forth in claim 1, wherein the loader is a plurality of loaders, the rail system is a plurality of rail systems, and each one of the plurality of loaders is axially aligned to a corresponding one of the plurality of rail systems.

5. The machine as set forth in claim 1, wherein the loader has a turntable operable to rotate, the frame fixedly mounted onto the turntable, the turntable rotatable so as to position the pair of supports in axial alignment with the pair of spaced apart rails.

6. The machine as set forth in claim 4, wherein pair of supports is a plurality of pair of supports, each of the plurality of pair of supports extending radially from the center of the turntable.

7. A method for filling a plurality of containers, each of the plurality of containers having a collar, the collar having a support surface, the method comprising the steps of:
   providing a machine operable to fill each of the plurality of containers;
   providing a carrier having a pair of flanges, one of the pair of flanges is spaced apart from the other so as to define a slot extending the length of the carrier, the slot configured to slidingly receive each of the plurality of containers, the support surface of the collar engaging each of the pair of flanges so as to suspend each of the plurality of containers within the carrier;
   providing a feeder, the feeder having a drive, a finger and a support member, the drive operatively attached to the support member, and the finger operatively attached to the drive, the drive moving the finger along the support member, the finger engaging the plurality of containers so as to slide the plurality of containers off of the carrier and into the machine;
   loading the carrier with the plurality of containers;
   mounting the carrier loaded with the plurality of containers to the machine; and
   feeding the plurality of containers to the machine.

8. The method as set forth in claim 7, wherein the carrier further includes an elongated first wall, a pair of side walls extending from opposing sides of the elongated first wall, and the one of the pair of flanges is disposed on one of the pair of side walls, and the other of the pair of flanges is disposed on the other of the pair of side walls, each of the pair of flanges extending towards each other and spaced a predetermined distance apart from each other so as to form a slot extending the length of the elongated first wall, and the collars of each of each of the predetermined number of containers engaging each of the pair of flanges so as to suspend each of the predetermined number of containers within the carrier.

9. The method as set forth in claim 7, wherein the machine includes a pair of spaced apart rails, the pair of spaced apart rails configured to engage the collar of each of the plurality of containers.

10. The method as set forth in claim 9, further including the step of providing a loader, the loader having a frame, the frame having a pair of supports, the pair of supports having a first support spaced apart and opposite a second support, the first and second supports configured to hold respective ends of the carrier so as to hold the carrier in axial alignment to the pair of spaced apart rails.

11. The method as set forth in claim 10, further including the step of mounting the carrier loaded with the plurality of containers onto the loader.

* * * * *